United States Patent [19]

Evenson et al.

[11] Patent Number: 5,186,567
[45] Date of Patent: Feb. 16, 1993

[54] QUICK-CONNECT FASTENERS FOR ASSEMBLING DEVICES IN SPACE

[75] Inventors: Erik E. Evenson, Seabrook; Clarence J. Wesselski, Alvin; Steve C. Ruiz, Houston, all of Tex.

[73] Assignee: The United States of America as represented by the Administrator of the National Aeronautics and Space Administration, Washington, D.C.

[21] Appl. No.: 824,806

[22] Filed: Jan. 15, 1992

[51] Int. Cl.$^5$ .............................................. B25G 3/00
[52] U.S. Cl. ........................................ 403/7; 403/171; 403/176; 403/290
[58] Field of Search ............... 403/171, 176, 172, 290, 403/7

[56] References Cited

U.S. PATENT DOCUMENTS

| | | | |
|---|---|---|---|
| 2,765,930 | 10/1956 | Greer et al. | 214/1 |
| 4,132,147 | 1/1979 | Contaldo | 403/290 X |
| 4,185,474 | 1/1980 | Kulischenko | 64/4 |
| 4,188,166 | 2/1980 | Moreau et al. | 414/735 |
| 4,424,045 | 1/1984 | Kulischenko et al. | 464/52 |
| 4,530,614 | 7/1985 | Ruter | 403/7 |
| 4,624,621 | 11/1986 | Murakami et al. | 414/735 |
| 4,636,135 | 1/1987 | Bancon | 414/730 |
| 4,763,459 | 8/1988 | Wesselski | 52/646 |
| 4,815,780 | 3/1989 | Obrist | 294/86.4 |
| 4,897,014 | 1/1990 | Tietze | 414/729 |
| 4,906,123 | 3/1990 | Weskamp et al. | 403/322 |
| 4,998,842 | 3/1991 | Sheridan | 403/252 |

Primary Examiner—Andrew V. Kundrat
Attorney, Agent, or Firm—Russell E. Schlorff; Guy M. Miller; Edward K. Fein

[57] ABSTRACT

A quick-connect fastener of a relatively-simple straightforward design is arranged with a tubular body adapted to be engaged against an attachment fitting in coincidental alignment with an opening in that fitting. A tubular collet having flexible fingers projecting from its forward end is arranged in the fastener body to be shifted forwardly by an elongated expander member coaxially arranged within the tubular collet for advancing the collet fingers into the opening in the attachment fitting. Biasing means are arranged between the elongated expander member and a rotatable actuator which is threadedly mounted within the tubular collet so as to be rotated for urging the expander member into engagement with the collet fingers. A first coupling member is arranged on the rotatable actuator to be accessible from outside of the fastener so that a second coupling member on the distal end of a flexible shaft can be introduced into the fastener body and coupled to the first coupling member to enable a typical actuating tool coupled to the shaft outside of the fastener body to be operated for advancing the outwardly-enlarged ends of the collet fingers into the opening in the attachment fitting and thereafter rotating the actuator member to expand the fingers within the opening for releasably latching the fastener to that attachment fitting. Upon expansion of the collet fingers, the biasing means impose a biasing force on the expander to releasably retain the fingers in their latching positions.

20 Claims, 2 Drawing Sheets

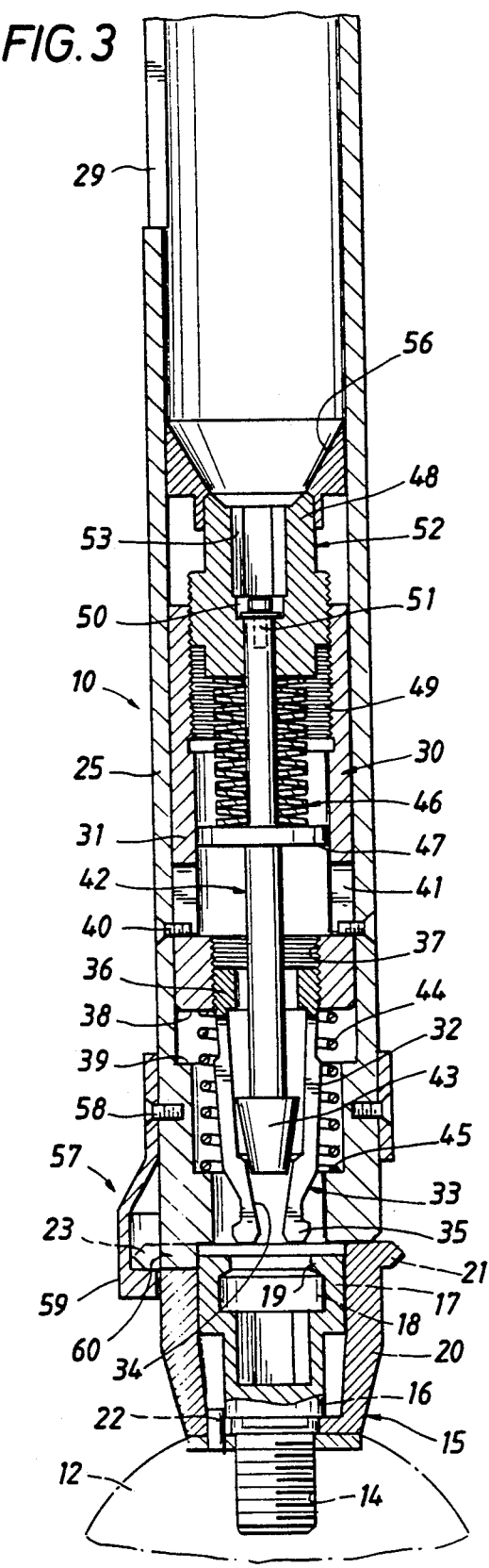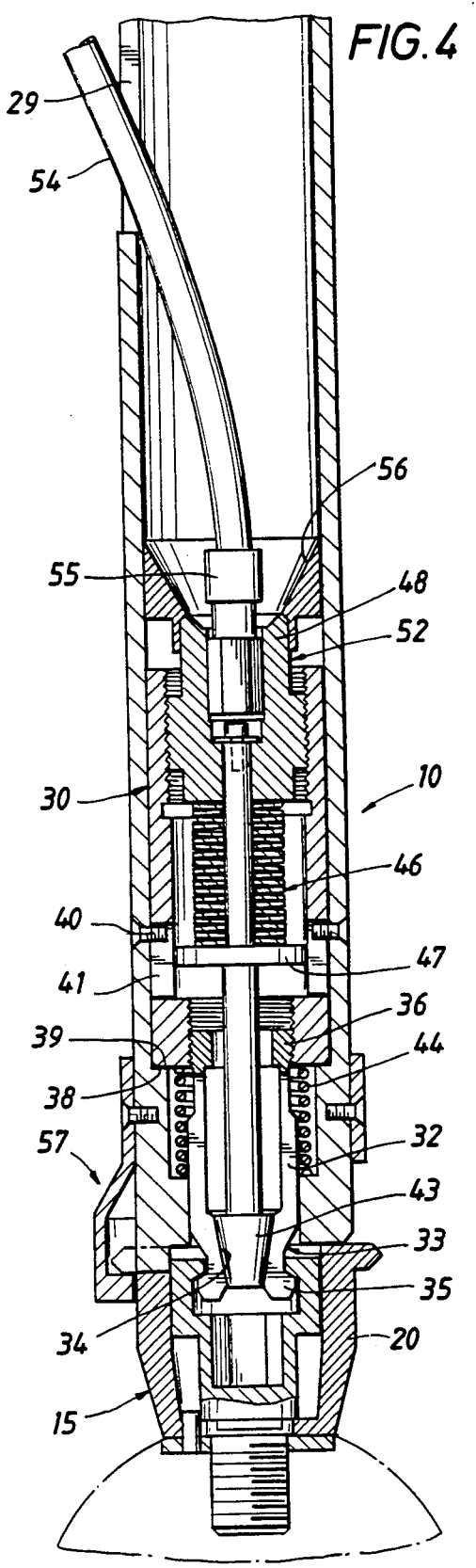

QUICK-CONNECT FASTENERS FOR ASSEMBLING DEVICES IN SPACE

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 42 U.S.C. 2457).

BACKGROUND OF THE INVENTION

1. Field of the Invention

Many proposals have been made heretofore to construct permanent stations in outer space which will include various structures that must be assembled either by human astronauts or by employing remotely-controlled robots.

Accordingly, the present invention pertains to new and improved fastener devices which are cooperatively arranged for easily and quickly connecting and disconnecting various subassemblies or elements that are disposed in outer space. In particular, this invention relates to new and improved quick connect fastener devices which can be effectively used in outer space by either astronauts or robots for securely intercoupling various structural members as well as quickly joining various components which are to be assembled and, as needed, subsequently disassembled with minimum effort.

2. Background Art

At present, it is proposed to construct the NASA space station by assembling a plurality of prefabricated tubular truss members into predetermined spatial configurations. The truss members are coupled to one another by fastener devices which are mounted on the ends of the structural members and arranged to be releasably attached to so-called "node-point" fittings. These fastener devices typically include a male projection which is adapted to be releasably secured within a selected socket on one of these node-point fittings. To facilitate the assembly of the truss members into different configurations, the sockets are spatially disposed around the node-point fittings in a predetermined pattern allowing the truss members to be positioned in various orientations relative to one another and coupled to one another by means of the node-point fittings.

Those skilled in the art will realize that any type of fastener which is to be utilized for assembling structures in outer space must be capable of being easily and quickly installed by personnel working under the adverse conditions of outer space. Moreover, once the respective components of a given structure have been intercoupled, it is absolutely essential that these components remain securely locked to one another until the structure is disassembled. It will also be appreciated that it may be necessary in the future to use remotely-controlled devices for assembling a variety of components in space. Thus, any fastener system which is to be utilized in space either for erecting structures or for intercoupling various devices must employ a relatively uncomplicated actuation mechanism which is capable of being readily operated by astronauts using simple manual tools or by remotely-controlled robotic assembly devices.

One particularly useful fastener system which has been proposed heretofore for assembling structures in outer space is disclosed in U.S. Pat. No. 4,763,459. The node-point fittings shown in that patent are formed as hollow spherical shells respectively having a plurality of spatially-disposed outwardly-facing openings into which tubular inserts are threaded. Each of these fastener devices has a forwardly projecting multi-fingered collet which is inserted into one of the tubular inserts and expanded for releasably locking the fastener to that node-point fitting. In this manner, with these fasteners mounted on the opposite ends of tubular truss members, the truss members can be releasably coupled to node point fittings to assemble structures of different configurations in outer space with a minimum of effort.

Another fastener of particular interest is shown in U.S. Pat. No. 4,998,842 where a toggle linkage mechanism is employed for advancing a collet with normally-contracted fingers into an opening in a spherical node-point fitting. Once enlarged shoulders on the ends of the collet fingers have passed through the opening, the continued operation of the toggle mechanism expands the collet for engaging those enlarged shoulders against the internal wall of the hollow node-point fitting. Biasing means are also provided for retaining the collet fingers in their expanded position.

SUMMARY OF THE INVENTION

Accordingly, it is an object of the present invention to provide new and improved fasteners for use in outer space for quickly and reliably connecting a variety of members.

It is a further object of the invention to provide new and improved quick-connecting fastener devices that can be installed manually by astronauts or by a remotely-controlled device for readily assembling structures in outer space.

These and other objects of the invention are attained by providing a fastener device to be releasably secured to a selected member. A tubular collet is arranged on the body of the fastener for movement along a longitudinal axis of the body from an initial position to an advanced position where normally-contracted flexible fingers projecting from the forward end of the collet are extended into a selected opening in the selected member. The collet fingers include enlarged forward portions sized to be collectively passed through the opening while the fingers are contracted. An elongated expander is coaxially arranged within the tubular collet to be advanced therein for expanding the fingers once their forward ends are within the opening for engaging the enlarged portions of the fingers with an inwardly-directed shoulder in the opening. Actuating means are arranged on the fastener device including an actuator member which is threadedly mounted within the tubular collet member and positioned therein so as to be accessible to a tool outside of the fastener which is advanced for inserting the ends of the collet fingers into the opening and then rotated so that the fingers will then be expanded to secure the fastener to the selected member. Biasing means are arranged between the actuator and expander members and operable in response to the rotative advancement of the actuator member along its mating threads within the collet member to provide a biasing force for retaining the expanded collet fingers in latching engagement against the shoulder in the opening.

BRIEF DESCRIPTION OF THE DRAWINGS

The several features of the invention are set forth with particularity in the appended claims. The arrangement and practice of the invention, together with further objects and various advantages thereof, may best be understood by way of the following description of an exemplary apparatus which incorporates the principles of the invention as shown in the accompanying drawings, in which:

FIG. 3 is a cross-sectioned elevational view of the new and improved quick-connect fastener which is arranged in accordance with the principles of the present invention for readily coupling and uncoupling two or more members; and FIG. 4 is a cross-sectioned elevational view similar to FIG. 3 but illustrates the quick-connect fastener after it has been securely coupled to a typical node-point fitting for assembling a plurality of truss members into a structure such as shown in FIG. 1.

DETAILED DESCRIPTION OF THE PREFERRED EMBODIMENT

Figure 1:
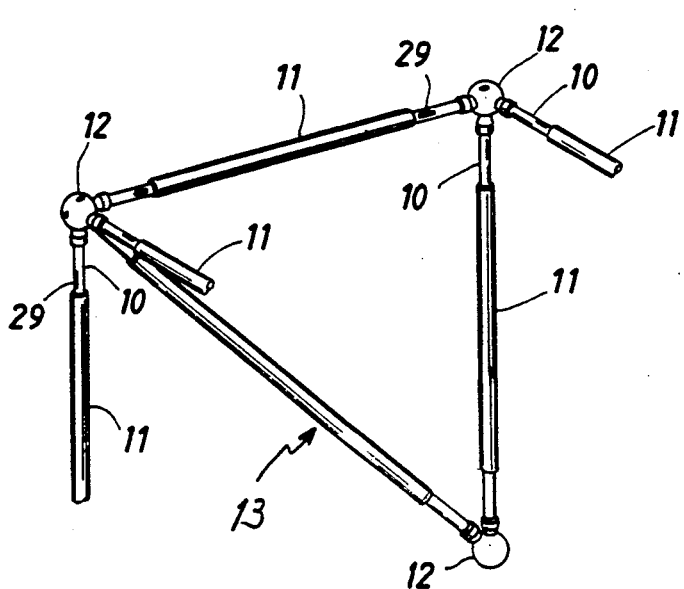
FIG. 1 is a small-scale isometric view of a portion of a structure that has been assembled in space by utilizing a plurality of quick-disconnect fasteners which are arranged in keeping with the principles of the invention.

Turning now to FIG. 1 a plurality of new and improved quick-connect fastener devices 10 of the present invention are depicted as being respectively mounted on the ends of a corresponding number of structural members such as elongated tubular members 11 which have been releasably coupled to a plurality of typical node-point fittings 12 for collectively assembling a large structural truss 13 of a predetermined configuration in outer space. Although the several node-point fittings 12 are depicted as being positioned only at the corners of the truss 13, it must be noted that other nodepoint fittings can also be utilized in conjunction with additional quick-connect fasteners 10 of the invention for tandemly coupling two or more of those tubular members 11 to one another to provide structural members of even greater lengths. Those skilled in the art will further recognize that by employing typical node-point fittings (such as shown at 12) having multiple apertures to which additional quick-connect fastener devices 10 of the present invention can be coupled, various numbers of structural members (that may be similar or different than the tubular members 11) can also be readily coupled to these multiple-aperture node-point fittings as needed for constructing a variety of structures of different configurations than the truss assembly shown partially at 13.

It should be noted that even though the forthcoming description of the quick-connect fastener devices 10 is primarily focussed on their utilization with robotic devices in outer space for coupling members to other members (such as coupling the elongated tubular members 11 to the node-point fittings 12) in order to assemble various structures such as the truss assembly 13, the scope of the invention is considered as also including the utilization of these unique fasteners in space to manually interconnect various members without elaborate manipulations or great force being needed to couple and uncouple those members.

It must also be noted that the quick-connect fasteners 10 of the present invention are not limited to utilization with only the structural members shown in FIG. 1. For example, the fasteners 10 can be effectively utilized with node-point fittings of various designs such as, for example, the hollow spherical fittings illustrated in U.S. Pat. No. 4,998,842. Moreover, the quick-connect fasteners 10 can be tandemly coupled to members such as the elongated tubular members 11 by simply butt-welding the ends of those members to the fasteners or by threadedly attaching the fasteners to so-called "strutend adapters" as described in U.S. Pat. No. 4,763,459. It will be appreciated, therefore, that the new and improved quick-connect fasteners 10 of the invention are considered to be essentially independent of the types of the particular members or apparatus to which these unique fasteners are to be releasably coupled as well as of the types of the members on which these fasteners are mounted.

Figure 2:
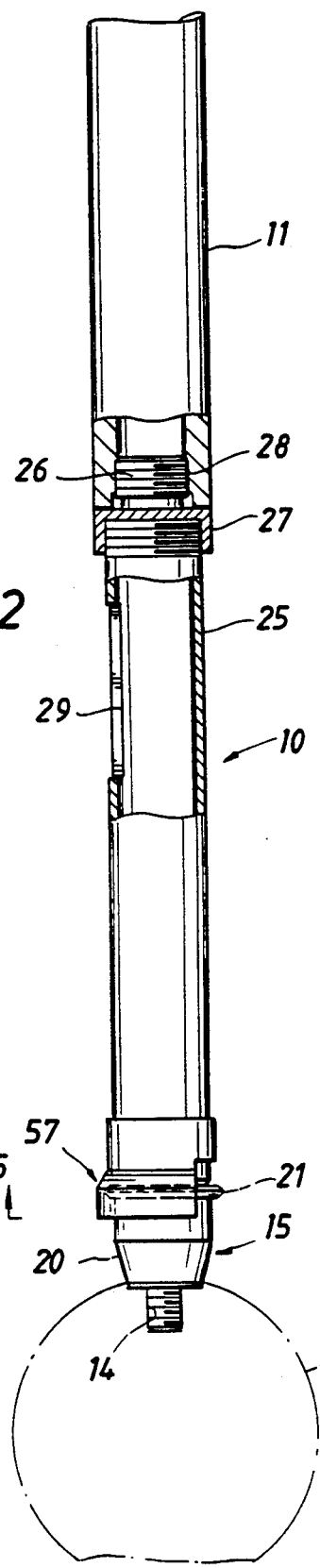
FIG. 2 is an elevational view in a larger scale than FIG. 1 illustrating the new and improved quick-connect fastener of the present invention as it might be typically employed in outer space for coupling a tubular truss member to a node-point fitting.
Figure 5:
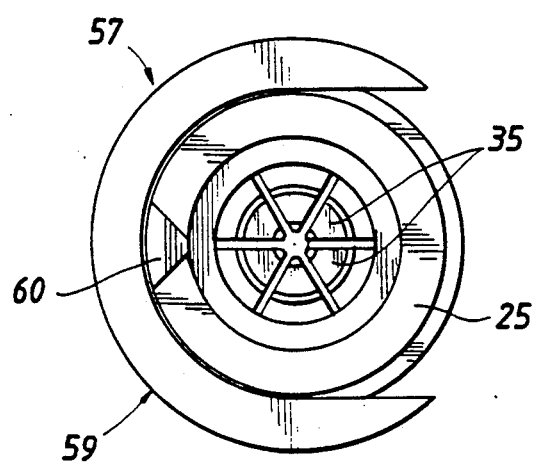

Turning now to FIG. 2, a partial elevational view is shown of a quick-connect fastener device 10 of the invention tandemly coupled to one of the tubular members 11 and is positioned for being selectively latched to one of the nodepoint fittings 12. The particular spatial orientation of the fastener 10 is, of course, wholly dependent upon which of the inserts 15 on the node-point fitting 12 is utilized. The openings 14 in the fittings 12 are preferably threaded for accommodating externally-threaded inserts as at 15. To facilitate the attachment and positioning of the fasteners 10 on the inserts 15, each insert is preferably comprised of a cylindrical inner body 16 with a threaded shank or rearward portion in one of the threaded openings 14 in the node-point fitting 12 and a larger-diameter forward portion 17 which is appropriately counterbored for defining an enlarged chamber 18 having an inwardly-turned annular shoulder 19 around the entrance to that enlarged axial chamber. The forward portion 17 of the inner body 16 is also configured for carrying an external tubular body 20 which is formed with an outwardly-turned beveled shoulder 21 around its forward end An index pin 22 is arranged for securing the outer body 20 on the inner body 16 to position a transverse slot 23 in the shoulder 21 in a predetermined angular orientation relative to the node-point fitting 12.

As illustrated in FIGS. 2 and 4, the quick-coupling fastener device 10 includes an elongated tubular outer body 25 which is tandemly coupled to the structural member 11 by means such as a coupling member 26 having an enlarged end 27 with a threaded socket arranged for complementally receiving the externally-threaded rearward end of the tubular fastener body and a reduced-diameter externally-threaded shank 28 on the other end of the coupling member which is disposed in a complemental internally-threaded socket in the adjacent end of the structural member In keeping with the principles of the present invention, the new and improved quick-coupling fastener 10 further includes an access opening such as an elongated slot or a longitudinal window 29 which, as will be subsequently explained, is appropriately situated along one side of the rearward portion of the fastener body 25 for providing convenient access to the interior of the forward portion of the fastener body.

Turning now to FIG. 3, an enlarged cross-sectioned elevational view is shown of a preferred embodiment of the quick-connect fastener 10 of the invention. The new and improved quick-coupling fastener device 10 includes a collet member indicated generally at 30 which is coaxially disposed in the outer body member 25 and arranged for axial movement along the central longitudinal axis of the body. For ease of fabrication, the collet member 30 is preferably arranged as a two-part assemblage comprising an elongated tubular support member 31 which is tandemly coupled to a somewhat-smaller tubular member 32 having a plurality of forwardly-projecting flexible fingers 33 which are best fabricated by cutting a series of circumferentially-spaced longitudinal slits along the forward portion of the smaller member. The forward portion of the smaller member 32 is appropriately shaped to respectively define inwardly-projecting internal shoulders 34 and outwardly-enlarged external shoulders 35 on the forward ends of the collet fingers 33.

The axially-directed collet fingers 33 are extended ahead of the base portion 36 of the tubular member 32 and, by virtue of the slits which respectively separate them, the several fingers are normally biased slightly inwardly and thereby maintain their forward ends in close proximity to one another To facilitate the positioning of the collet fingers 33 within the elongated support member 31, the longitudinal bore of the tubular collet support member is appropriately sized and threaded, as at 37, for threadedly receiving the externally threaded base portion 36 of the smaller tubular member 32. By virtue of these intercoupling threads 37, it will be appreciated that whenever the quick-connect fastener device 10 is being assembled, the collet fingers 33 can be precisely positioned along the axis of the two-part collet member 30 as may be required to assure the proper operation of the fastener. It will, of course, be recognized that once the forward member 32 is appropriately positioned on the support member 31, the tandemly-coupled members will comprise the unitary collet member 30.

The unitary collet member 30 is cooperatively arranged within the outer body 25 to be moved axially therein between the depicted rearward position and a more-advanced forward position (as illustrated in FIG. 4) in which an external shoulder, such as may be defined by the forward end 38 of the larger-diameter collet support member 31, is engaged with an opposing rearwardly-directed internal shoulder 39 arranged within the forward portion of the fastener body.

Inwardly-directed threaded pins 40 are mounted on the outer body 25 and arranged with their respective free ends slidably disposed in longitudinal slots 41 on opposite sides of the collet support member 31 for preventing rotation of the two-part collet member 30 in relation to the outer body In addition, the forward ends of the elongated slots 41 are appropriately located in relation to the guide pins 40 to establish the rearward position of the collet member 30, with the overall lengths of these slots being sufficient to enable the forward end 38 of the collet support member 31 to engage the internal shoulder 39 within the fastener body 25 whenever the unitary collet member has been shifted to its advanced position within the outer body.

To selectively expand the forward ends of the collet fingers 33, a stiff rod or elongated shaft 42 is coaxially arranged within the two-part collet member 30 for movement along the longitudinal or central axis of that member. As shown in FIG. 3, the shaft 42 is cooperatively positioned within the two-part collet member 30 so that a frustoconical end portion 43 of the elongated shaft is normally disposed within the rearwardly-facing frustoconical cavity that is collectively defined by the inwardly-directed, rearwardly facing shoulders 34 of the collet fingers 33. As will be subsequently described by reference to FIG. 4, the rearwardly-facing inward shoulders 34 on the ends of the collet fingers 33 and the tapered forward end 43 of the elongated shaft are cooperatively sized and complementally shaped so that whenever the shaft 42 is advanced forwardly with respect to the two-part collet member 30, the tapered forward nose portion of the shaft will progressively expand the inwardly-contracted forward ends of the collet fingers radially outwardly in relation to one another.

As illustrated in FIG. 3, the new and improved quick coupling fastener device 10 further includes biasing means such as a relatively-weak coil spring 44 which, as a matter of convenience, is preferably mounted around the mid-portion of the tubular collet member 32 and cooperatively disposed between opposed shoulders 38 and 45 respectively defined by the forward end of the collet support member 31 and within the outer body 25. In its normal biasing position, the coil spring 44 is operative for maintaining the unitary collet member 30 in its depicted rearward position as established by the engagement of the forward ends of the elongated slots 41 with the inwardly-projecting guide pins 40. The biasing means further include a stack of bevelled disc springs or so-called "Belleville washers" 46 coaxially arranged on the rearward portion of the shaft 42 and cooperatively disposed within the tubular support member 31 between an enlarged shoulder 47 on the mid-portion of the shaft and the forward face of an externally-threaded annular actuator 48 which is cooperatively arranged to be selectively rotated along an internally threaded counterbore 49 that is formed within the rearward portion of the tubular collet support member 31 It will be noted that in the preferred embodiment of the new and improved quick-coupling fastener 10, the mating threads formed on the annular actuator 48 and in the counterbore 49 are preferably extra-fine machine threads so as to minimize the actuating torque required for rotatively advancing the actuator along the longitudinal axis of the collet support member 31.

The elongated shaft 42 is loosely disposed within the axial bore through the actuator member 48 and terminated in a rearwardly-opening counterbore 50 in the annular actuator Once the actuator 48 is installed over the elongated shaft 42, the shaft is secured from moving forwardly in relation to the actuator by a suitable stop means 51 which, by way of example, can be a flat washer that is disposed on the bottom surface of the counterbore 50 and rotatably secured therein below the head of an axially-directed machine screw threaded into the upper end portion of the shaft. By virtue of the threaded engagement of the actuator member 48 within the tubular support member 31 as well as the loose fit of the elongated shaft 42 within the bore of the annular actuator member, it will be recognized that the actuator can be rotated independently of the shaft without carrying the shaft forwardly from its initial position Thus, by manually rotating the annular actuator member 48 in one rotational direction so as to moderately compress the stack of disc springs 46, the actuator can be selectively positioned within the fastener body 25 for imposing a predetermined pre-loading biasing force on the collet fingers 33 before the quick connect fastener device 10 is installed. As will be subsequently described, additional rotation of the annular actuator 48 in the same direction will advance the nose 43- of the elongated shaft 42 further into the collet fingers 33. Nevertheless, the engagement of the washer serving as the stop means 51 with the shoulder defined by the bottom surface of the counterbore 50 will be effective for subsequently returning the shaft 42 to its initial position in response to the counter rotation of the actuator 48 in the opposite direction.

Those skilled in the art will appreciate that rotation of the annular actuator 48 can be conveniently carried out by utilizing various manual tools or robotic devices which can be positioned outside of the fastener body 25 and then operatively coupled to the actuator within the body as will be required for selectively rotating the actuator relative to the collet support member 31. Accordingly, in keeping with the objects of the invention, the new and improved quick-coupling fastener 10 includes actuating means (such as indicated generally at 52) which are cooperatively arranged for selectively advancing and retracting the elongated shaft 42 as required to expand and contract the collet fingers 33. As best illustrated in FIG. 3, the actuating means 52 include means by which an external actuating device can be releasably coupled to the internal actuator 48 and then selectively operated from outside of the fastener body 25 for rotatably driving the internal actuator member between its operating positions inside of the fastener body 25. To enable an external actuating device to be releasably coupled to the unique fastener 10, an axially-aligned socket 53 that preferably has a hexagonal configuration is provided in the counterbore 50 in the rearward face of the annular actuator member 48. It will be particularly noted from FIG. 4 that the elongated opening 29 is appropriately located in the rearward portion of the fastener body 25 well to the rear of the annular actuator member 48 to ensure that the socket 53 is easily accessible from outside of the body.

In the preferred manner of rotatively driving the shaft 42 in space, a powered robotic actuating device (which is not illustrated in the drawings) is cooperatively arranged for driving an elongated flexible shaft 54 that carries a typical hexagonal head 55 on its distal end. A rearwardly-diverging frustoconical guide 56 is mounted on the retainer member 48 and concentrically disposed around the entrance to the socket 53 for cooperatively directing the flexible shaft 54 toward the center of the fastener body 25 and reliably positioning the hexagonal head 55 in axial alignment with its complemental socket. To facilitate the axial movement of the head 55 into the socket 53, the flexible shaft 54 is preferably a typical shaft assembly adapted for operation at relatively-low rotational speeds and which has sufficient rigidity to be certain that when at least moderate axial forces are applied to the flexible shaft, the hexagonal head will be reliably advanced into the frustoconical guide 56 without the shaft doubling back onto itself.

Alternatively, a suitable flexible shaft may also be arranged from short rigid members that are tandemly coupled by means of flexible links or pivots which are capable of carrying both moderate axial loads as well as rotational torques. Accordingly, it is considered that the scope of the present invention is not restricted to either specific types of flexible shafts nor to particular end fittings such as the hexagonal socket 53 and its companion mating head 55 that are respectively depicted on the actuator member 48 and the flexible shaft 54. Thus, the fastener device 10 of the present invention may readily utilize any useful arrangement of various drive fittings including complemental splines, tangs or other matched female/male fittings appropriately arranged on the associated ends of a suitable flexible shaft assembly and the annular actuator 48.

In the preferred manner of operating the quick-coupling fastener 10 of the present invention, a powered robotic tool (not illustrated in the drawings) which carries the flexible shaft 54 is initially manipulated or appropriately operated in such a manner that the hexagonal head 55 mounted on the distal end of the shaft will be inserted into the outer body 25 by way of the elongated window 29. After the head 55 has been inserted into the window 29, the actuating tool is then moved in a generally-forward direction in relation to the fastener device 10 or manipulated as required for advancing the flexible shaft 54 further into the forward portion of the outer body 25 for directing the hexagonal head toward its mating socket 53.

It must be appreciated, however, that even though the hexagonal head 55 is not visible during these movements of the actuating tool, the advancement of the flexible shaft 54 into the outer body 25 will, as a minimum, indiscriminately position the hexagonal head at some location that is within the confines of the rearwardly-facing frustoconical guide 56. Once the hexagonal head 55 has been positioned within the guide 56, it will be appreciated that the converging walls of the frustoconical guide will effectively direct the head forwardly and inwardly toward the hexagonal socket 53 as the flexible shaft 54 is advanced further into the outer body 25. Ultimately, the forwardly-converging walls of the guide 56 will assuredly direct the hexagonal head 55 to the center of the guide where the hexagonal head will be axially aligned with the hexagonal socket 53 so that application of a forward force on the flexible shaft 54 (in addition to or in conjunction with the initial rotation of the flexible shaft) will be effective for inserting the head into mating engagement within the socket. Once the hexagonal head 55 is operatively seated within its mating socket 53, the robotic tool coupled to the flexible shaft 54 will then be ready for imparting an axial force against the actuator member 48 as well as for rotatively driving the actuator member along the machine threads in the threaded counterbore 49.

Once the hexagonal head 55 has been seated within the socket 53, the continued advancement of the exterior robotic actuating device (not illustrated in the drawings) outside of the quick-connect fastener 10 will simply impose a minor forwardly-directed force on the stacked Belleville washers 46. This moderate axial force acting through the flexible shaft 54 will not, however, be sufficient to overcome the combined spring force of the stacked Belleville washers 46. Thus, when the robotic actuating device is being initially advanced, the forwardly-directed axial force applied by the flexible shaft 54 will be transmitted through the stacked disc springs 46 and act on the shoulder 47 on the elongated shaft 42 for imposing this moderate force on the rearwardly-facing shoulders 34 of the still-contracted collet fingers 33. This moderate force will be sufficient for quickly overcoming the spring force of the weak coil spring 44 and immediately advancing the collet member 30 forwardly in relation to the fastener body 25 for easily inserting the forward ends of the still-contracted collet fingers 33 into the opening 18 in the adjacent insert fitting 15.

In the preferred embodiment of the quick-coupling fastener 10, the axial force on the shaft 42 needed for expanding the collet fingers 33 will be at least slightly greater than the axial force required to overcome the opposing biasing force of the spring 44. In this manner, once the axial force transmitted through the flexible shaft 54 has overcome the force of the spring 44 and engaged the forward end of the support member 31 with the shoulder 39, the contracted collet fingers will be advanced into the opening 18 and the initial rotation of an external robotic actuator will require the application of only a modest torque to the flexible shaft 54 to rotate the actuator member 48 within the threaded counterbore 49 and quickly overcome the weak biasing force of the spring 44 so that the collet fingers 33 will be expanded within the opening 18. It is also significant that by virtue of the Belleville washers 46, the amount of torque required for rotating the annular actuator 48 will increase slowly to a peak value as the enlarged end 43 of the shaft 42 is moved slowly against the contracted forward end portions of the collet fingers 33. Those skilled in the art will recognize, therefore, that the relatively-low initial operating torque requirements of the actuating means 52 is of substantial importance when a robotic actuator is being used to operate the quick-connect fastener 10 of the present invention for latching the fastener to an insert fitting as at 15.

It will be seen from FIG. 4 that when the fastener device 10 is moved forwardly to overcome the biasing force of the coil spring 44, the shoulders 35 on the still-contracted forward ends of the collet fingers 33 will be inserted into the enlarged chamber 18 in the insert member 15 where they will be positioned ahead of the inwardly-directed shoulder 19 encircling the entrance of the chamber 18. Thereafter, rotation of the actuator member 48 will expand the forward ends of the collet fingers 33 as the enlarged end 43 of the shaft 42 is advanced into the concavity collectively defined between the inwardly-directed shoulders 34 of the collet fingers. Then, upon rotation of the actuator member 48, the forward ends of the collet fingers 33 will expand outwardly within the chamber 18 in the insert member 15. Expansion of the forward end portions of the collet fingers 33 will, of course, be effective for securely latching the fastener 10 to the insert fitting 15 so long as the enlarged end portion 43 of the shaft 42 remains between the inwardly-projecting shoulders 34 on the forward ends of the collet fingers.

It will be recognized by those skilled in the art that the increasing forces which will be slowly imposed on the Belleville washers 46 by virtue of the advancement of the annular actuator member 48 along the extra-fine threads in the counterbore 49 will only moderately compress the stacked washers between the actuator and the intermediate shoulder 47 on the elongated shaft 42. It will also be recognized that by using the stacked Belleville washers for the biasing means, a sufficient biasing force can be readily developed in response to only a minimum axial travel of the actuator member 48 in relation to the shaft 42 being required for moderately compressing the disc springs 46. Accordingly, the Belleville washers 46 can be readily compressed with only a modest increase of the actuating torque being needed to rotate the flexible shaft 54 for securely latching the quick-connect fitting 10 to the insert 15. Hereagain, where a robotic actuator is to be employed for operating the new and improved quick-connect coupler 10, it is a distinct advantage of the actuating means 52 that the relatively-low torque required for initially advancing the actuator member 48 is followed by only a modest increase in torque being required for expanding the collet fingers 33.

The moderate compression of the stacked Belleville washers 46 will nevertheless develop a sufficient biasing force on the shaft 42 for reliably preventing any retrograde movement of the elongated shaft so long as the actuator 48 remains in its advanced position shown in FIG. 4. This biasing force will also be effective for firmly urging the outwardly-directed shoulders 35 on the fingers 33 against the inward face of the shoulder 19 in the node-point fitting 12 so as to keep the fastener 10 securely coupled to the node-point fitting. This is effective for preventing the loss of at least the preloaded bias force on the Belleville washers 46 in the event that there is a relaxation of the truss 13 after it is assembled as well as for relieving bending moments at the joints that might develop due to assembly or fabrication residuals.

It will be appreciated from FIG. 4 that whenever the quick-connect fastener 10 is to be employed for securing a first member (such as one of the tubular structural members 11) to a second member (such as one of the inserts 15 on one of the node-point fittings 12), the forward end of the outer body member 25 must be firmly engaged against the insert and maintained in axial alignment with the insert fitting while the actuating means 52 are being operated. Those skilled in the art will, of course, recognize that this is not always easily accomplished in outer space regardless of whether the task is done manually or with a powered robotic actuator. Accordingly, to facilitate these essential requirements, the quick-coupling fastener 10 is provided with alignment means including a typical so-called "capture guide" 57 coaxially aligned with the central axis of the body 25 and secured to its forward end by means such as one or more set screws 58. A forwardly-projecting portion of the capture guide 57 is configured for defining an enlarged yoke or U-shaped shroud 59 having at least a partial cavity complementally shaped for receiving an adjacent sectorial segment of the enlarged beveled shoulder 21 defined around the forward end of the outer insert body 20.

It will, of course, be recognized that the set screws 58 will enable the U-shaped capture guide 57 to be mounted in a predetermined angular orientation on the fastener body 25. Thus, a pair of the quick-connect fasteners 10 of the present invention can be tandemly mounted on the opposite ends of a selected structural member (such as one of the elongated tubular members 11) with the open sides of these U-shaped shrouds 59 being respectively located in the same angular orientation to facilitate the simultaneous placement of these two shrouds onto the external bodies 20 mounted on separate node-point fittings 12 which are to be coupled to one another by the structural member. This simultaneous placement of the shrouds 59 over their respective node-point fittings 12 will, of course, require that these external bodies 20 mounted on the node-point fittings have also been correctly positioned beforehand for properly aligning their respective transverse slots 23 to prepare for installation of an interconnecting structural member 11 carrying the new and improved fasteners 10 on each end thereof.

By virtue of the U-shaped configuration of the shroud 59, it will be appreciated that the capture guide 57 on one of the fasteners 10 can be positioned immediately adjacent to the beveled shoulder 21 on the exterior body 20 of the insert fitting 15 and then readily moved laterally relative thereto for slipping the open side of the shroud over the adjacent portion of the beveled shoulder to dispose that portion of the shoulder within the partial cavity in the shroud. A forwardly-projecting tang 60 is cooperatively arranged on one side of the fastener body 25 to be moved into the transverse slot 23 in the beveled shoulder 21 when the fastener body is moved laterally for initially disposing the U-shaped shroud 59 over the shoulder 21. It will be realized, therefore, that once the capture guide 57 is embracing the outstanding beveled shoulder 21, the quick-connect fastener 10 will be securely retained from moving axially away from the insert 15 as well as from rotating in relation to the insert. This will, of course, maintain the quick-connect fastener 10 securely positioned in relation to the node-point fitting 12 for countering both longitudinal and rotational forces that are being applied to the fastener while it is being operated.

Of particular importance to the practice of the present invention it should be noted that the actuating means 52 can also be operated by rotating the flexible shaft 54 in the opposite direction so as to retract the elongated shaft 42. Accordingly, when the annular actuator 48 is rotated in the reverse direction, the slidable engagement of the washer providing the stop means 51 against the bottom surface of the counterbore 50 will shift the elongated shaft 42 back toward its initial retracted position to withdraw the enlarged nose portion 43 from the concavity defined by the inwardly-turned shoulders 34 of the collet fingers 33. There will be an associated reduction in the biasing force of the Belleville washers 46 so that once the enlarged nose 43 of the shaft 42 is disengaged from the inwardly-turned shoulders 34 on the collet fingers 33, the coil spring 44 will move the collet member 30 rearwardly to re-engage the forward ends of the elongated slots 41 with their associated guide pins 40. It will be appreciated, therefore, that once the collet fingers 33 in one of the quick-coupling fasteners 10 are retracted from one of the insert fittings 15, the quick-connect fastener and its associated tubular member 11 can be readily uncoupled from the node-point fittings 12 without disturbing either the spatial relationships or changing the relative positions of the other members which may be included in a particular assemblage such as the truss structure 13. This is, of course, a major advantage in those situations where adjacent elements of an overall assembly such as the truss structure 13 can not be conveniently moved apart or turned away for accommodating the removal or the replacement of one or more interconnected members.

Accordingly, it will be appreciated that by using the quick-connect fasteners 10 of the present invention, these fasteners can be easily coupled to other devices such as the node-point fittings 12 with a minimum of effort. Since the new and improved fasteners 10 can be easily installed and removed by simply turning the annular actuator 48 with a moderate force, it is of particular significance that these fasteners 10 can be operated by robotic devices having only limited output torques. Moreover, by employing a flexible shaft, as at 54, a robotic device which is being operated for attaching the fasteners 10 of the invention to various structural elements requires very little placement precision with little or no feedback to simply insert the shaft into the side openings 29 and reliably engage the hexagonal head 55 within the socket 53.

It will be further realized that any one of several relatively-inexpensive manual actuating tools (not depicted.. in the drawings) can also be conveniently employed for driving the annular actuator 48. For example, astronauts operating in space suits out in outer space can readily employ simple socket wrenches with flexible shafts carrying terminal heads sized to fit in the sockets 53 for manually assembling and disassembling spatial structures such as partially shown at 13 in FIG. 1. Thus, by virtue of the simplicity of the unique fasteners 10, automatic and manual tools of relatively-simple designs can be alternatively used for operating these fasteners as well as for adjusting the fasteners should it be deemed necessary. Moreover, those skilled in the art will also recognize that there are many other obvious advantages for uncomplicated and inexpensive quick-connect fasteners, as at 10, where two or more diverse elements must be repeatedly uncoupled and coupled in outer space without employing complicated and cumbersome special-purpose actuating devices. It goes without saying that by virtue of the simple, straightforward design of the new and improved quick-coupling fasteners 10 of the invention, there will be a minimum of problems in maintaining these unique fasteners as well as the external actuating tools which will be required for operating these quick-coupling fasteners.

While only a particular embodiment of the apparatus of the present invention has been shown and described herein, it is apparent that various changes and modifications may be made without departing from the principles of the present invention in its broader aspects; and, therefore, the aim in the claims appended hereto is to cover all such changes and modifications as fall within the true spirit and scope of this invention.

What is claimed is:

1. A quick-connect fastener to be coupled to a member having an opening and comprising:

a tubular body having an access opening in one side thereof and an open forward end arranged to be engaged against another member with the longitudinal axis of said tubular body aligned with an opening in another member;

a tubular collet coaxially mounted within said body ahead of said access opening and arranged to be moved along said longitudinal axis and including forwardly-projecting flexible fingers having enlarged ends sized to enter an opening in another member when said fingers are contracted;

an expander cooperatively arranged within said collet to be advanced against said flexible fingers for expanding said finger ends within an opening in another member;

an externally-threaded actuator cooperatively arranged in said collet to be advanced forwardly therein toward said expander in response to rotation of said actuator;

said actuator and operable in response to advancement of said actuator within said collet for urging said expander forwardly against said flexible fingers and expanding said finger ends once they are inserted into an opening; and actuating means operable for rotating said actuator from outside of said tubular body including a first coupling member coaxially arranged on the rear of said actuator and accessible from said access opening, a flexible shaft having sufficient rigidity to withstand moderate axial forces and arranged to pass through said access opening and be directed toward said first coupling member in response to movements of an actuating device positioned outside of said tubular body to the rear of said side opening and coaxially coupled to the rearward end of said flexible shaft for imparting axial and rotational forces thereto, and a second coupling member mounted on the forward distal end of said flexible shaft and arranged to be passed through said access opening and releasably engaged with said first coupling member for imparting said axial and rotational forces to said actuator before said flexible shaft and second coupling member are subsequently withdrawn from within said tubular body by way of said access opening.

2. The quick-connect fastener of claim 1 wherein said tubular body includes a rearward end portion arranged to be tandemly coupled to a tubular member having its longitudinal axis in coincidental alignment with said longitudinal axis of said tubular body.

3. The quick-connect fastener of claim 1 including a spring cooperatively arranged between said collet and said tubular body for normally urging said collet rearwardly on said tubular body and yieldable in response to application of a forwardly-directed force on said collet for inserting said finger ends into an opening in another member.

4. The quick-connect fastener of claim 1 wherein said biasing means include at least one disc spring operable for developing a biasing force as said disc spring is compressed between said expander and said actuator by the advancement of said actuator toward said expander.

5. The quick-connect fastener of claim 1 wherein said biasing means include at least one disc spring operable for developing an initial biasing force by moving said actuator to a selected initial position in said collet to partially compress said disc spring before said fastener is coupled to another member and thereafter operable for developing an increased biasing force when said actuator is subsequently advanced toward said expander to further compress said disc spring for thereafter maintaining said finger ends expanded within an opening.

6. The quick-connect fastener of claim 1 including means for disengaging said expander from said finger ends to retract them when said actuator is rotated in the opposite direction for moving said actuator away from said expander.

7. The quick-connect fastener of claim 1 wherein said fingers have inwardly-directed shoulders and said expander includes a reduced forward end and an enlarged intermediate portion arranged so that said forward end of said expander will engage said inwardly-directed shoulders of said fingers while they are still contracted inwardly for advancing said finger ends through an opening and said enlarged portion of said expander will engage said inwardly-directed shoulders for radially expanding said finger ends within that opening.

8. The quick-connect fastener of claim 7 wherein said biasing means includes a stack of disc springs operable for developing an initial biasing force by moving said actuator to a selected initial position in said collet to partially compress said disc springs before said fastener is coupled to another member and thereafter operable for developing an increased biasing force when said actuator is subsequently advanced toward said expander to further compress said disc springs for engaging said enlarged portion of said expander against said inwardly-directed shoulders for maintaining said finger ends radially expanded within that opening.

9. The quick-connect fastener of claim 8 wherein said tubular body includes a rearward end portion arranged to be tandemly coupled to a tubular member having its longitudinal axis in coincidental alignment with said longitudinal axis of said tubular body.

10. The quick-connect fastener of claim 8 including means cooperatively arranged for releasably coupling said forward end of said tubular body to that other member and holding said tubular body aligned with that opening.

11. A quick-connect fastener to be coupled to a member having an opening therein with an inwardly-directed internal shoulder and an outwardly-directed external shoulder and comprising:

a tubular body having an access opening in one side thereof and including a rearward end arranged to be tandemly coupled to a tubular member having its longitudinal axis in coincidental alignment with the longitudinal axis of said tubular body and an open forward end arranged to be engaged against another member with said longitudinal axis of said tubular body aligned with an opening in that other body;

a tubular collet having an internally-threaded portion and coaxially mounted within said tubular body ahead of said access opening for movement in said tubular body along said longitudinal axis and including a plurality of forwardly projecting flexible fingers having enlarged ends which are collectively sized for entering an opening in another member when said fingers are contracted;

an elongated shaft coaxially mounted within said collet and including a frustoconical forward end portion which is cooperatively arranged to be advanced against said flexible fingers for moving said enlarged finger ends forwardly into an opening on another body and then expanding said enlarged finger ends outwardly within that opening;

an externally-threaded annular actuator cooperatively arranged in said internally-threaded portion of said collet and coaxially disposed around said elongated shaft to be advanced toward its said forward end portion in response to rotation of said actuator within said internally-threaded collet portion;

biasing means coaxially arranged within said collet between said forward end portion of said elongated shaft and said actuator and operable in response to advancement of said actuator within said internally-threaded collet portion for urging said forward end portion of said elongated shaft forwardly against said flexible fingers and expanding said finger ends once they are inserted into an opening; and actuating means operable for rotating said actuator from outside of said tubular body including a first coupling member coaxially arranged on the rear of said actuator and accessible from said access opening, a flexible shaft having sufficient rigidity to withstand moderate axial forces and arranged to pass through said access opening and be directed toward said first coupling member in response to movements of an actuating device positioned outside of said tubular body to the rear of said side opening and coaxially coupled to the rearward end of said flexible shaft for imparting axial and rotational forces thereto, and a second coupling member mounted on the forward distal end of said flexible shaft and arranged to be passed through said access opening and releasably engaged with said first coupling member for imparting said axial and rotational forces to said actuator before said flexible shaft and second coupling member are subsequently withdrawn from within said tubular body by way of said access opening.

12. The quick-connect fastener of claim 11 including means cooperatively arranged for releasably coupling said forward end of said tubular body to another member and holding said tubular body aligned with an opening in that other member.

13. The quick-connect fastener of claim 11 including a spring cooperatively arranged between said collet and said tubular body for normally urging said collet rearwardly in said tubular body and yieldable in response to application of a forwardly-directed force on said collet carrying said collet forwardly for inserting said enlarged finger ends into an opening in another member in readiness for their subsequent expansion therein in response to rotation of said actuator within said internally-threaded collet portion.

14. The quick-connect fastener of claim 13 wherein said biasing means include a stack of annular disc springs disposed around said elongated shaft cooperatively arranged for imposing a biasing force against its said forward end portion as said disc springs are compressed between said actuator and said forward end portion of said elongated shaft in response to the advancement of said actuator within said internally threaded collet portion for expanding said enlarged finger ends after said spring has yielded for inserting said enlarged finger ends within that opening in another member.

15. The quick-connect fastener of claim 11 wherein said biasing means include a stack of annular disc springs disposed around said elongated shaft cooperatively arranged for developing an initial biasing force by rotating said actuator to an initial position within said internally-threaded collet portion to partially compress said disc springs before said fastener is coupled to another member and thereafter operable for developing an increased biasing force when said actuator is subsequently advanced within said internally-threaded collet portion to further compress said disc springs for expanding said enlarged finger ends within an opening in another member and maintaining said enlarged finger ends radially expanded therein.

16. The quick-connect fastener of claim 11 including means for disengaging said forward end portion of said elongated shaft from said enlarged finger ends to retract them when said actuator is rotated in the opposite direction within said internally-threaded collet portion for moving said actuator away from said forward end portion of said elongated shaft.

17. The quick-connect fastener of claim 11 wherein said enlarged finger ends have inwardly-directed shoulders arranged so that as said forward end portion of said elongated shaft is progressively advanced against said inwardly-directed shoulders of said enlarged finger ends, said enlarged finger ends will be inserted into an opening in another member and thereafter be radially expanded within that opening.

18. The quick-connect fastener of claim 17 wherein said biasing means include at least one disc spring operable for developing an initial biasing force by rotating said actuator to a selected initial position in said threaded collet portion to partially compress said disc spring before said fastener is coupled to another member and thereafter operable for developing an increased biasing force when said actuator is subsequently advanced along said internally-threaded collet portion toward said forward end portion of said shaft to further compress said disc spring for engaging said forward end portion of said shaft with said inwardly-directed shoulders and thereafter maintain said finger ends radially expanded within that opening in another member.

19. Structural members arranged to be quickly coupled together and comprising:
   a hollow attachment fitting having an opening between its outer and inner surfaces;
   a tubular fastener body arranged to be axially aligned with an opening in said attachment fitting and including an access opening in a rearward portion thereof and a forward portion having an open end to be engaged against said outer surface of said attachment fitting surrounding said opening;
   a tubular collet having an internally-threaded portion and coaxially arranged within said forward end portion of said tubular fastener body for axial movement therein, said collet including normally-contracted forwardly-extending flexible fingers having outwardly-enlarged ends sized to be collectively passed through said opening in said attachment fitting when said open end of said tubular fastener body is engaged around said opening;
   means operable for releasably coupling said tubular fastener body to said attachment fitting after said open end of said tubular fastener body has been engaged around said opening and including a frustoconical expander coaxially arranged in the forward end portion of said collet for moving forwardly into engagement with said collet fingers, an actuator threadedly coupled within said internally-threaded collet portion for being advanced therealong in response to rotation of said actuator, and a stack of disc biasing springs coaxially mounted in said collet between said expander and said actuator and operable in response to advancement of said actuator for moving said expander into engagement with said collet fingers for expanding said outwardly-enlarged finger ends within said opening; and
   actuating means operable for rotating said actuator from outside of said tubular body including a first coupling member coaxially arranged on the rear of said actuator and accessible from said access opening, a flexible shaft having sufficient rigidity to withstand moderate axial forces and arranged to pass through said access opening and be directed toward said first coupling member in response to movements of an actuating device positioned outside of said tubular body to the rear of said side opening and coaxially coupled to the rearward end of said flexible shaft for imparting axial and rotational forces thereto, and a second coupling member mounted on the forward distal end of said flexible shaft and arranged to be passed through said access opening and releasably engaged with said first coupling member for imparting said axial and rotational forces to said actuator before said flexible shaft and second coupling member are subsequently withdrawn from within said tubular body by way of said access opening 20. The structural members of claim 19 wherein said attachment fitting is a node-point fitting to be installed at one corner of an assembly of structural members.

* * * * *